O. H. Catey,
Land Marker.
No. 94,185. Patented Aug. 31, 1869.
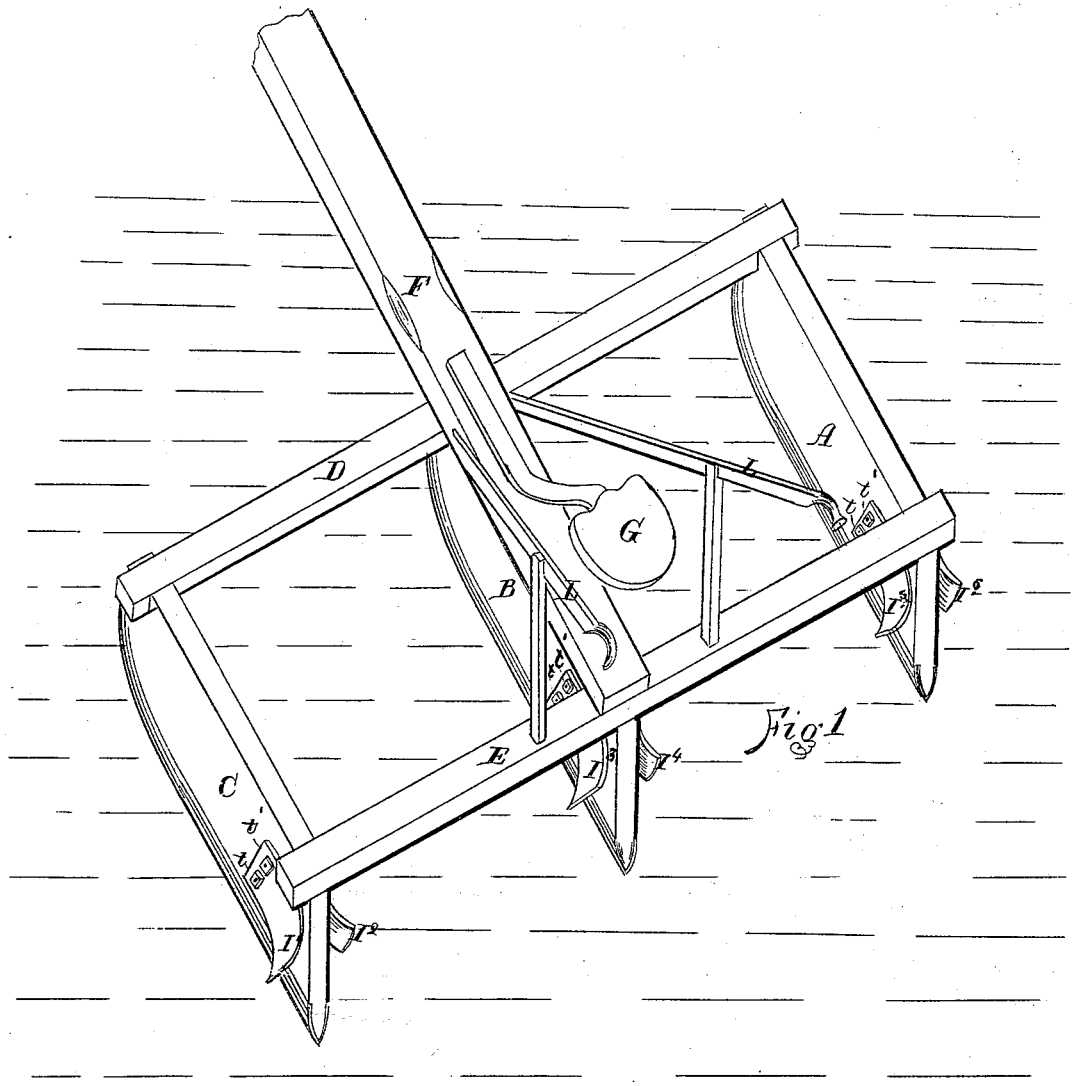
Fig. 1
Fig. 2
Inventor
Oliver H. Catey
Per Artemas Roberts
his Attorney
Witnesses
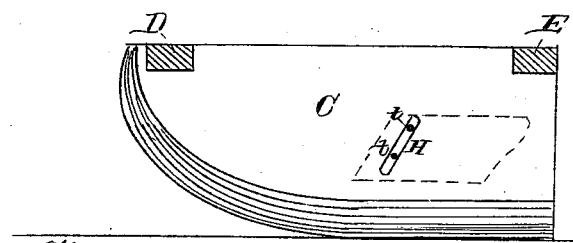

United States Patent Office.

OLIVER H. CATEY, OF WILLIAMSBURG, INDIANA.

Letters Patent No. 94,185, dated August 31, 1869.

IMPROVEMENT IN MARKER FOR CORN-GROUND.

The Schedule referred to in these Letters Patent and making part of the same.

*To all whom it may concern:*

Be it known that I, OLIVER H. CATEY, of Williamsburg, in the county of Wayne, and State of Indiana, have invented a new and improved Marker for Corn-Ground; and I do hereby declare that the following is a full and exact description thereof, reference being had to the accompanying drawings, making a part of this specification.

The nature of my invention consists in placing adjustable wings on each side of the runners of an ordinary sled-marker, as will be hereinafter described, the object of the wings being to remove clods from near the mark in which the corn is to be dropped, thus facilitating the operation of covering, the device being of special advantage when it is designed to cover the corn with a plow or other implement, to which a horse may be attached.

In the accompanying drawings—

Figure 1 is a perspective view of my improved marker for corn-ground, and

Figure 2 is a side elevation of one runner, showing the mode of attaching the wings so as to render them adjustable.

The same letters in the different figures refer to corresponding parts.

The three runners A B C, are made of plank, rounded at the forward ends, as shown in the drawings, and each provided with a shoe of iron, that is bevelled to the lower edge that it may sink more readily into the soil.

These runners are held in place by the cross-pieces D and E, which may be further braced, if necessary.

F is the tongue or pole, and

G, the driver's seat.

L L are handles, designed for convenience in adjusting the marker to the proper place at the end of the rows.

Each pair of the wings $I^1 I^2$, &c., is held in place by two bolts, $t\ t'$, that pass through a slot in the runner, marked H, and are provided with nuts, by means of which the wings are clamped sufficiently close upon the runners to hold them in any required position, while the slot will allow them, when the nuts are loosened, to be moved up or down, as may be required by the condition of the soil to be operated upon.

The wings $I^1 I^2$, &c., should be made of steel, and curved outward, so that the extreme points will be at least six inches from the runners.

The advantages of this arrangement are obvious.

With the marker herein described, three rows may be laid off at one operation, (or more by adding to the number of runners,) with greater accuracy than can be done with any implement marking a single row, while the devices here claimed as new are such as to render it applicable to any kind of soil, by removing the clods so as to leave only fine earth to be drawn over the corn in covering.

Having thus fully described my said invention,

What I claim, and desire to secure by Letters Patent, is—

The adjustable wings $I^1 I^2$, &c., in combination with the runners A B, &c., when the different parts are constructed and operated substantially as herein shown and described.

OLIVER H. CATEY.

Witnesses:
ARTEMAS ROBERTS,
SAML. F. ESTELL.